US007164100B2

(12) United States Patent
Petrenko et al.

(10) Patent No.: US 7,164,100 B2
(45) Date of Patent: *Jan. 16, 2007

(54) HIGH-FREQUENCY DE-ICING OF CABLEWAYS

(75) Inventors: Victor F. Petrenko, Lebanon, NH (US); Charles R. Sullivan, Hanover, NH (US)

(73) Assignee: The Trustees of Dartmouth College, Hanover, NH (US)

( * ) Notice: Subject to any disclaimer, the term of this patent is extended or adjusted under 35 U.S.C. 154(b) by 146 days.

This patent is subject to a terminal disclaimer.

(21) Appl. No.: 10/057,859

(22) Filed: Jan. 24, 2002

(65) Prior Publication Data

US 2003/0000718 A1  Jan. 2, 2003

Related U.S. Application Data

(60) Continuation-in-part of application No. 09/426,685, filed on Oct. 25, 1999, now Pat. No. 6,563,053, which is a division of application No. 09/094,779, filed on Jun. 15, 1998, now Pat. No. 6,027,075, and a continuation-in-part of application No. PCT/US00/05665, filed on Mar. 1, 2000, and a continuation-in-part of application No. PCT/US99/28330, filed on Nov. 30, 1999, and a continuation-in-part of application No. PCT/US99/25124, filed on Oct. 26, 1999.

(60) Provisional application No. 60/263,943, filed on Jan. 24, 2001, provisional application No. 60/131,082, filed on Apr. 26, 1999, now abandoned, provisional application No. 60/131,082, filed on Apr. 26, 1999, now abandoned, provisional application No. 60/122,463, filed on Mar. 1, 1999, now abandoned, provisional application No. 60/122,463, filed on Mar. 1, 1999, now abandoned, provisional application No. 60/105,782, filed on Oct. 27, 1998, now abandoned, provisional application No. 60/110,440, filed on Dec. 1, 1998, now abandoned.

(30) Foreign Application Priority Data

Jan. 22, 2002 (WO) ............. PCT/US02/01858

(51) Int. Cl.
*H05B 3/00* (2006.01)
(52) U.S. Cl. ............ 219/201; 219/770; 174/19
(58) Field of Classification Search ........... 219/201, 219/535, 501, 780, 270, 770, 209, 497, 635, 219/636, 637, 772; 307/125, 147; 174/11 BR; 343/704; 364/550; 191/62, 33 PM, 27; 324/533; 244/134 R; 62/187; 428/503
See application file for complete search history.

(56) References Cited

U.S. PATENT DOCUMENTS 1,157,344 A  10/1915  Thomson
(Continued)

FOREIGN PATENT DOCUMENTS

CN  1079578  12/1993
(Continued)

OTHER PUBLICATIONS

"Icing Wind Tunnel", Meeting the Challenges of Ice Testing In a World-Class Facility—BF Goodrich Aerospace Ice Protection Systems, 4 pages.
(Continued)

*Primary Examiner*—Quang Van
(74) *Attorney, Agent, or Firm*—Lathrop & Gage LC

(57) ABSTRACT

High-frequency AC voltage with a frequency in a range of from 60 to 100 kHz supplied from a power source at 3 to 15 kV is applied to an electrical conductor within about 30 cm of a cableway. The high-frequency AC voltage generates an alternating electric field. Capacitive AC current associated with the alternating electric field flows through the ice on the cableway and on the electrical conductor, causing dielectric loss heat that melts the ice.

38 Claims, 5 Drawing Sheets

U.S. PATENT DOCUMENTS

| | | | |
|---|---|---|---|
| 1,656,329 A | | 1/1928 | Sievert et al. |
| 1,944,054 A | * | 1/1934 | Ackerman .................. 104/247 |
| 2,496,279 A | | 2/1950 | Ely et al. |
| 2,870,311 A | | 1/1959 | Greenfield |
| 3,042,918 A | * | 7/1962 | Casey ......................... 343/704 |
| 3,204,084 A | | 8/1965 | Spencer, Jr. |
| 3,316,344 A | * | 4/1967 | Kidd et al. .................. 428/553 |
| 3,316,345 A | | 4/1967 | Toms et al. |
| 3,526,920 A | | 9/1970 | Byers |
| 3,610,861 A | * | 10/1971 | Storey et al. ................ 219/637 |
| 3,790,752 A | | 2/1974 | Boaz et al. |
| 3,825,371 A | | 7/1974 | Roder et al. |
| 3,835,269 A | * | 9/1974 | Levin et al. ................... 191/62 |
| 3,915,883 A | | 10/1975 | VanMeter et al. |
| 3,971,056 A | | 7/1976 | Jaskolski et al. |
| 4,054,672 A | | 10/1977 | Inoue et al. |
| 4,082,962 A | * | 4/1978 | Bargsdorf et al. ........... 307/147 |
| 4,085,338 A | | 4/1978 | Genrikh et al. |
| 4,137,447 A | | 1/1979 | Boaz |
| 4,190,137 A | * | 2/1980 | Shimada et al. .............. 191/27 |
| 4,278,875 A | | 7/1981 | Bain |
| 4,296,298 A | * | 10/1981 | MacMaster et al. ........ 219/780 |
| 4,321,296 A | | 3/1982 | Rougier |
| 4,330,702 A | | 5/1982 | Cheng |
| 4,330,703 A | | 5/1982 | Horsma et al. |
| 4,376,598 A | | 3/1983 | Brouns et al. |
| 4,409,428 A | * | 10/1983 | Dey et al. ...................... 174/43 |
| 4,638,960 A | | 1/1987 | Straube et al. |
| 4,651,825 A | | 3/1987 | Wilson |
| 4,690,353 A | | 9/1987 | Haslim et al. |
| 4,732,351 A | | 3/1988 | Bird |
| 4,737,618 A | | 4/1988 | Barbier et al. |
| 4,760,978 A | | 8/1988 | Schuyler et al. |
| 4,773,976 A | | 9/1988 | Vexler |
| 4,814,546 A | | 3/1989 | Whitney et al. |
| 4,875,644 A | * | 10/1989 | Adams et al. ........... 244/134 R |
| 4,887,041 A | * | 12/1989 | Mashikian et al. ......... 324/533 |
| 4,897,597 A | | 1/1990 | Whitener |
| 4,950,950 A | | 8/1990 | Perry et al. |
| 4,974,503 A | | 12/1990 | Koch |
| 4,985,313 A | | 1/1991 | Penneck et al. |
| 5,012,868 A | | 5/1991 | Bridges |
| 5,109,140 A | | 4/1992 | Nguyen |
| 5,112,449 A | | 5/1992 | Jozefowicz et al. |
| 5,143,325 A | | 9/1992 | Zieve et al. |
| 5,144,962 A | | 9/1992 | Counts et al. |
| 5,172,024 A | | 12/1992 | Broussoux et al. |
| 5,218,472 A | | 6/1993 | Jozefowicz et al. |
| 5,330,291 A | | 7/1994 | Heath et al. |
| 5,344,696 A | | 9/1994 | Hastings et al. |
| 5,398,547 A | | 3/1995 | Gerardi et al. |
| 5,411,121 A | * | 5/1995 | LaForte et al. ......... 191/33 PM |
| 5,441,305 A | | 8/1995 | Tabar |
| 5,496,989 A | | 3/1996 | Bradford et al. |
| 5,523,959 A | * | 6/1996 | Seegmiller ................... 364/550 |
| 5,551,288 A | | 9/1996 | Geraldi et al. |
| 5,555,736 A | * | 9/1996 | Wills et al. .................... 62/187 |
| 5,586,213 A | | 12/1996 | Bridges et al. |
| 5,630,360 A | | 5/1997 | Polny, Jr. |
| 5,744,704 A | | 4/1998 | Hu et al. |
| 5,861,855 A | * | 1/1999 | Arsenault et al. ........... 343/704 |
| 5,873,254 A | | 2/1999 | Arav |
| 5,902,962 A | * | 5/1999 | Gazdzinski ............. 174/113 R |
| 5,947,418 A | | 9/1999 | Bessiere et al. |
| 6,018,152 A | * | 1/2000 | Allaire et al. ................ 219/501 |
| 6,027,075 A | * | 2/2000 | Petrenko .................. 244/134 R |
| 6,031,214 A | | 2/2000 | Bost et al. |
| 6,043,471 A | * | 3/2000 | Wiseman et al. ........... 219/662 |
| 6,102,333 A | | 8/2000 | Gerardi et al. |
| 6,129,314 A | | 10/2000 | Giamati et al. |
| 6,134,096 A | | 10/2000 | Yamada et al. |
| 6,145,787 A | | 11/2000 | Rolls |
| 6,194,685 B1 | | 2/2001 | Rutherford |
| 6,218,647 B1 | | 4/2001 | Jones et al. |
| 6,227,492 B1 | | 5/2001 | Schellhase et al. |
| 6,239,601 B1 | | 5/2001 | Weinstein |
| 6,270,118 B1 | | 8/2001 | Ichikawa |
| 6,279,856 B1 | | 8/2001 | Rutherford et al. |
| 6,330,986 B1 | | 12/2001 | Rutherford et al. |
| 6,370,004 B1 | | 4/2002 | Yamaguchi |
| 6,396,172 B1 | * | 5/2002 | Couture ..................... 307/125 |
| 6,427,946 B1 | | 8/2002 | Petrenko |
| 6,478,259 B1 | | 11/2002 | Cordaro |
| 6,492,629 B1 | * | 12/2002 | Sopory ....................... 219/535 |
| 6,550,508 B1 | | 4/2003 | Yamaguchi et al. |
| 6,570,333 B1 | | 5/2003 | Miller et al. |
| 6,576,115 B1 | | 6/2003 | Petrenko |
| 6,723,971 B1 | * | 4/2004 | Petrenko et al. ............ 219/770 |

FOREIGN PATENT DOCUMENTS

| | | | |
|---|---|---|---|
| DE | 44 40 634 | | 7/1996 |
| EP | 1168888 | | 1/2002 |
| FR | 2570333 | | 3/1986 |
| GB | 2 252 285 A | | 8/1992 |
| GB | 2259287 | | 3/1993 |
| JP | 57060684 | | 4/1982 |
| JP | 5292638 | | 11/1993 |
| JP | 7023520 | | 1/1995 |
| JP | 11041768 | | 2/1999 |
| JP | 41133074 | * | 11/1999 |
| RU | SU 587548 | * | 1/1978 |
| SU | 26363 | | 8/1931 |
| SU | 587548 | | 1/1978 |
| SU | 936040 | | 6/1982 |
| WO | WO 94/20819 | | 9/1994 |
| WO | WO 95/30495 | | 11/1995 |

OTHER PUBLICATIONS

"New Goodrich Wind Tunnel Tests Advanced Aircraft De-Icing Systems", by Edward H. Phillips, Uniontown, Ohio, Aviation Week Magazine, Oct. 3, 1998, 3 pages.

"The Evolution of Ice Protection Creates a Revolution Ice Detection", BFGoodrich Aerospace Ice Protection Systems, 2 pages, No date.

AIA 94-0714, "Interface Influences Upon Ice Adhesion to Airfoil Materials", by A. Reich, BF Goodrich Aerospace/De-Icing Systems, Brecksville/Uniontown, OH (32nd Aerospace Sciences Meeting and Exhibit, Jan. 10-13, 1994) pp. 1-8.

Brecksville/Uniontown, OH (32.sup.nd Aerospace Sciences Meeting and Exhibit Jan. 10-13, 1994), pp. 1-8.

Electromechanical Phenomena in Ice; Victor F. Petrenko; Thayer School of Engineering Special Report 96-2; Feb. 1996.

Generation of electric fields by ice and snow friction, by Victor F. Petrenko and Smauel C. Colbeck, (May 1, 1995), pp. 4518-4521.

Generation of electric fields by ice and snow friction; Victor F. Petrenko; J. Appl. Phys. 77 (9), May 1, 1995; 1995 American Institute of Physics.

Khusnatdinov N N et al: "Electrical Properties Of The Ice/Solid Interface" Journal Of Phusical Chemistry. B, Materials, Surfaces, Interfaces And Biophysical, Washington, D.C. US vol. 101, Jul. 17, 1997, pp. 6212-6214.

The effect of static electric fields on ice friction; Victor F. Petrenko; J. Appl. Phys. 76 (2), Jul. 15, 1994; 1994 American Institute of Physics.

* cited by examiner

HIGH-FREQUENCY DE-ICING OF CABLEWAYS

RELATED APPLICATIONS

This application claims the benefit of U.S. provisional application Ser. No. 60/263,943, filed Jan. 24, 2001, and of PCT application PCT/US02/01858, filed 22 Jan. 2002. This application is also a continuation-in-part of commonly-owned and U.S. patent application Ser. No. 09/426,685, filed Oct. 25, 1999 now U.S. Pat. No. 6,563,053, which is a divisional application of U.S. patent application Ser. No. 09/094,779, filed Jun. 15, 1998, issued as U.S. Pat. No. 6,027,075 on Feb. 22, 2000. This application is also a continuation-in-part application of commonly-owned and PCT application PCT/US00/05665, filed 1 Mar. 2000, which claimed the benefit of U.S. provisional application Ser. No. 60/122,463, filed 1 Mar. 1999, now abandoned, and provisional application Ser. No. 60/131,082, filed 26 Apr. 1999, now abandoned, and which is a continuation-in-part application of commonly-owned and PCT application PCT/US99/28330, filed 30 Nov. 1999, which claims the benefit of U.S. provisional application Ser. No. 60/110,440, filed Dec. 1, 1998, now abandoned, the benefit of U.S. provisional application Ser. No. 60/122,463, filed Mar. 1, 1999, now abandoned, and the benefit of U.S. provisional application Ser. No. 60/131,082 filed Apr. 26, 1999, now abandoned. This application is also a continuation-in-part application of commonly-owned and PCT application PCT/US99/25124, filed 26 Oct. 1999, which claims the benefit of U.S. provisional application Ser. No. 60/105,782, filed 27 Oct. 1998, now abandoned. Each of the applications mentioned above is hereby incorporated by reference.

GOVERNMENT LICENSE RIGHTS

The U.S. Government has certain rights in this invention as provided for by the terms of Grant No. DAAH 04-95-1-0189, awarded by the Army Research Office, and of Grant No. MSS-9302792, awarded by the National Science Foundation.

BACKGROUND OF THE INVENTION

Field of the Invention

The invention relates to methods, systems and structures for removing ice from surfaces, in particular, to deicing cableways, such as ski lift cables.

STATEMENT OF THE PROBLEM

The presence of ice on solid surfaces causes various types of problems. For example, excessive ice accumulation on aircraft wings endangers the plane and its passengers. Ice on ship hulls creates navigational difficulties, expenditure of additional power to navigate through water and ice, and unsafe conditions. Icing on power transmission lines adds weight to the power lines, causing power outages, resulting in millions of dollars of direct and indirect damage.

Problems associated with the formation and presence of ice on ski lift structures and other cableway systems are well known. Cableways, towers and related structures are exposed to wide ranges and varying conditions of temperature, humidity and precipitation that lead to the formation and buildup of ice. Ice interferes with smooth and efficient operation of cableway systems. Ice on cables and associated structures frequently causes expensive damage. More importantly, ice on cableways and towers poses safety risks. Ice and snow deposits on cables and coupling structures can cause system malfunctions while being used to transport people. Heavy accumulations of ice or snow pose risks of cables snapping. Furthermore, deposits of snow and ice that accumulate on cables and other cable system structures and break off at elevated places pose a serious risk of falling on people below and injuring them. Similar problems occur as a result of icing on towers, bridges, ship superstructures, freezers and other objects on which ice commonly forms.

SUMMARY OF THE INVENTION

The present invention helps to solve some of the problems mentioned above by providing systems and methods for de-icing of surfaces, in particular, the surfaces of cables, towers, and other components of cableway systems, such as ski lifts.

Systems and methods in accordance with the invention de-ice surfaces of components of cableway systems by melting ice in high-frequency alternating electric fields through dielectric loss heating. In certain aspects, an electrical conductor is disposed proximate to a cableway or other ski lift component to be protected against icing. A high-frequency AC voltage provided in the electrical conductor creates a high-frequency alternating electric field ("AEF") possessing capacitive AC current. The capacitive AC current (displacement current) associated with the AEF in air flows through ice on the surface of the cableway system component. A portion of the current flows through the ice capacitively, and a portion of the current flows through the ice resistively (conductively). The resistive AC current flowing through the ice generates Joule heat, which melts the ice. Thus, ice absorbs capacitive energy in the AEF, transforming it into heat that melts ice.

In certain aspects, a system for de-icing a surface of a cableway system component includes: an electrical conductor proximate to the surface; and, an AC power source for providing a high-frequency AC voltage in the electrical conductor. Preferably, the AC power source supplies power having a frequency in a range of about from 60 kHz to 100 kHz and a voltage in a range of about from 3 to 15 kV.

Numerous factors affect the dielectric loss heating of the ice. Generally, increasing voltage increases the strength of the AEF, thereby increasing the capacitive energy of the AEF. Increasing voltage increases the total current associated with the AEF. Increasing frequency also increases the total amount of AC current flowing through ice. Typically, the electrical conductor is an electrically conducting cable. An advantage of one aspect of the invention is that the electrical conductor and the cableway system component, which preferably functions as electrical ground, are disposed relatively close to each other. Typically, the electrical conductor is disposed in a range of from 0 to 30 cm from the surface of the cableway system component acting as electrical ground. Commonly, the surface of a cableway is being protected against ice and snow. In another common application of the invention, the surface of a cableway system tower is protected. Preferably, the cableway system component being protected against ice functions as an electrical sink, or electrical ground. Another aspect of the invention may include a separate electrical sink, with the surface of the cableway system component preferably located between the electrical conductor and the electrical sink. In another aspect of the invention, the electrical conductor is electrically insulated from electrical ground. In typical embodiments, therefore, in which a cableway system component being protected serves as electrical ground, the electrical conductor is electrically insulated from the cableway system component, that is, from the cableway, cableway system tower or other component. In another aspect of the invention, two proximately-located electrical conductors are energized 180 degrees out of phase from each other, thereby generating the high-frequency alternating electric field in the ice.

A method in accordance with one aspect of the invention for de-icing a cableway system includes: applying a high-frequency high-voltage AC voltage to an electrical conductor located proximate to the surface of a cableway system component. Preferably, the AC voltage has a frequency in a range of about from 60 kHz to 100 kHz and a voltage in a range of about from 3 kV to 15 kV.

Another aspect of the invention may include a transformer to transform AC voltage having a low voltage to a higher voltage to increase the strength of the AEF. Such transformers, for example, may be located at appropriate distance intervals along the cableway system path.

Further, dielectric loss heating may be combined with skin-effect ("induction") heating at high frequency to melt ice and snow on cableways. Other aspects of the invention may include a means for frequency-tuning the high-frequency AC voltage to match the standing-wave effects of ice-dielectric heating and the skin-effect heating resulting from high-frequency current flow in a conductor. An aspect of the invention may also include a means for varying the AC frequency to change the heating pattern produced by standing wave effects of ice-dielectric heating and skin-effect heating, thereby providing sufficient heat at all locations at various times to prevent icing.

The invention is next described further in connection with preferred embodiments, and it will become apparent that various additions, subtractions, and modifications can be made by those skilled in the art without departing from the scope of the invention.

BRIEF DESCRIPTION OF THE DRAWINGS

A more complete understanding of the invention may be obtained by reference to the drawings, in which.

DETAILED DESCRIPTION OF THE INVENTION

Figure 1:
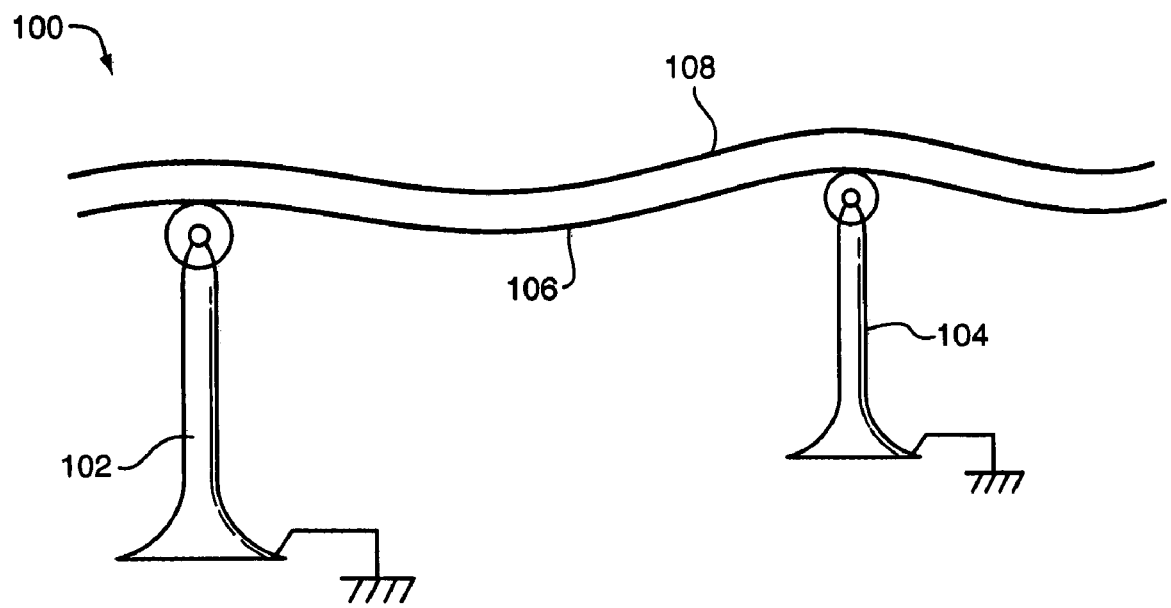
FIG. 1 depicts a system in accordance with the invention in which an electrical conductor carrying high-frequency AC voltage is disposed in close proximity to a ski lift cableway.

The invention includes methods, systems and structures that melt ice and snow on the surface of an object by providing high-frequency AC voltage to generate an alternating electric field ("AEF") at the surface. Ice in the AEF transforms a portion of the capacitive AC current associated with the AEF into conductivity (resistive) AC current, which generates Joule heat in the ice. Although embodiments in accordance with the invention are described below principally with respect to ski lift de-icing, it is understood that the invention is useful in many types of applications.

The term "de-icing" is used in a general sense in this specification. It refers to systems and methods for removing ice and snow from cableway systems, such as ski lifts, as well as preventing the formation of significant deposits of ice and snow. In particular, it refers to melting of snow and ice. Throughout this specification, reference is often made to "ice". The term "ice" refers generally to all forms of frozen water, including snow. Similarly, the term "cableway system", "transport system" and related terms refer principally to cableways used for support or movement of chair ski lifts, surface lifts (e.g., skis remain on the ground and are pulled forward), gondolas, aerial tramways, ropeways, funicular railways, cable cars and other cableway systems; but the terms can also refer to other structures, for example, freezers, bridges, towers, and cables supporting a bridge, tower, or tent. Generally, elongated structures de-iced in accordance with the invention are electrically conductive, such as electrically conductive, metal cableways. In some embodiments, a nonconductive structure is treated to be electrically conductive, such as through application of a conductive coating.

PCT application PCT/US00/05665, filed 1 Mar. 2000, published as WO 00/52966, which is hereby incorporated by reference in its entirety, describes the use of high-frequency AC current to melt ice on a power line. When a lossy dielectric material, such as ice, is disposed in an AEF, AC current associated with the AEF generates heat in the material through dielectric loss. The heating power, $W_h$, per cubic meter of dielectric material is:

$$W_h = \frac{\omega \varepsilon \varepsilon_0}{4\pi} \tan\delta \, (\overline{E^2}) \qquad (1)$$

where $\varepsilon$ is a relative dielectric permittivity, $\varepsilon_0$ is a dielectric permittivity of free space ($\varepsilon_0$=8.85×10$^{-12}$ F/m), $\omega$ is an angular frequency of the AEF ($\omega$=2$\pi$f, in which f is the AC frequency of the power line), tan$\delta$ is the tangent of dielectric loss, and $(\overline{E^2})$ is the average of electric field squared. The value of the electric field, E, increases with applied voltage. At a frequency of 60–100 kHz, the value of $\varepsilon$ in ice is about 3.2. For given values of $\varepsilon$ and tan$\delta$, an increase of frequency, f, or electric field strength, E, increases the dielectric loss heating in ice, resulting in increased heating power, $W_h$.

Functionally, an electrical conductor is "proximate to" a surface if an AC voltage in the conductor generates an AEF that causes sufficient dielectric loss heating in the ice to melt the ice. The term "proximate to" also refers to an electrical conductor that is integral with the cableway system component being protected. For example, in certain embodiments in accordance with the invention, an integral part of a cableway serves as the electrical conductor. The term "proximate to" is also used to refer to distance between an electrical conductor and an electrical sink (or electrical ground). Practically, the term "proximate to" in this specification generally means within a distance of about 30 cm.

In accordance with the present invention, ice on lift cables, on lift towers or on some other structural cableway system component is melted in high-frequency alternating electric fields. The high frequency of the current flowing through the electrical conductor is generally greater than 0.5 kHz. Theoretically there is no upper limit on the frequency used. Preferably, frequencies in a range (e.g., 60 kHz to 100 kHz) similar to those used in power line de-icing are used. But due to a smaller distance between the electrical conductor and the cableway (or other component functioning as electrical ground) compared to power line systems, de-icing of cableway system components is typically accomplished with a lower voltage than that used in power-line de-icing. The strength of the AEF (E in equation (1), above) depends on several factors, in particular, on the voltage in the conductor and on the distance between the electrical conductor and electrical ground. In systems involving power transmission lines, the distance between the transmission line carrying high-frequency high-voltage current and an electrical sink functioning as electrical ground (e.g., another power line, a tower, earth) is typically several meters or more. As a result, the alternating electric field strength dissipates over a large distance. In contrast, in preferred embodiments in accordance with the present invention, the distance between the electrical conductor at maximum voltage amplitude and electrical ground is smaller, so the AEF is correspondingly stronger for a given voltage. Preferably, the distance between an electrical conductor and an electrical sink (electrical ground) is a small as possible, so long as the electrical conductor and electrical sink are not in direct electrical contact so that a strong AEF is generated. Also, the impedance to AC current flow is typically lower in a typical system for de-icing of cableway system than in power line de-icing systems. In a power transmission line system, electrical ground for the capacitive AC current associated with the AEF is typically several meters away, separated from the ice by air. In a cableway system, ice carrying capacitive current associated with an AEF typically rests on the cableway, ski tower or other component, which serves as electrical ground. As a result, the impedance encountered by the capacitive AC current is relatively low. Thus, for a given electric field strength and AC frequency, the capacitive AC current passing through the ice increases, making more energy available for heating. For these reasons, 3 to 15 kV is typically sufficient for cableway system de-icing, instead of 30 kV or more in power-line de-icing. It is clear that voltages exceeding 3–15 kV are useful in embodiments in accordance with the invention. Depending on structural dimensions and operating conditions, lower voltages, for example 500 volts, are also useful. The term "high-voltage" and related terms in the specification generally mean a voltage of 500 volts or higher.

In embodiments in accordance with the invention, the electrical conductor is electrically insulated from electrical ground. The term "electrically insulated" and related terms are used in their general sense to mean that there is no direct electronic conduction between the electrical conductor and electrical ground, which is typically a cableway, a tower or other electrically conducting cableway system component. Of course, in embodiments in which the surface being protected against icing is electrically insulated from electrical ground (or some electrical sink), the electrical conductor may be in direct physical or electrical contact with the electrically insulated surface. Also, the electrical conductor is part of a circuit including an AC power source, which inevitably includes some connection to electrical ground, but which does not prevent generation of a strong AEF between the conductor and the surface.

FIG. 1 depicts a system 100 in accordance with the invention suitable for de-icing ski lift cableways. System 100 includes conventional ski lift transport system towers 102, 104, which support ski lift cableway 106 in a conventional manner. Ski lift cable 106 carries conventional ski lift chairs (not shown). System 100 further comprises electrical conductor 108, which is located proximate to ski lift cable 106. In accordance with the invention, a high-frequency high-voltage AC current flows through electrical conductor 108. In preferred embodiments in accordance with the invention, the AC current in electrical conductor 108 has a frequency in a range of from 60 kHz to 100 kHz. The high voltage generates an AEF. Preferably, ski lift cableway 106 and electrical conductor 108 are disposed at a distance in a range of from 0 to 30 cm. At this distance, a voltage in a range of from 3 to 15 kV in electrical conductor 108 is typically sufficient for melting ice.

Figure 2:
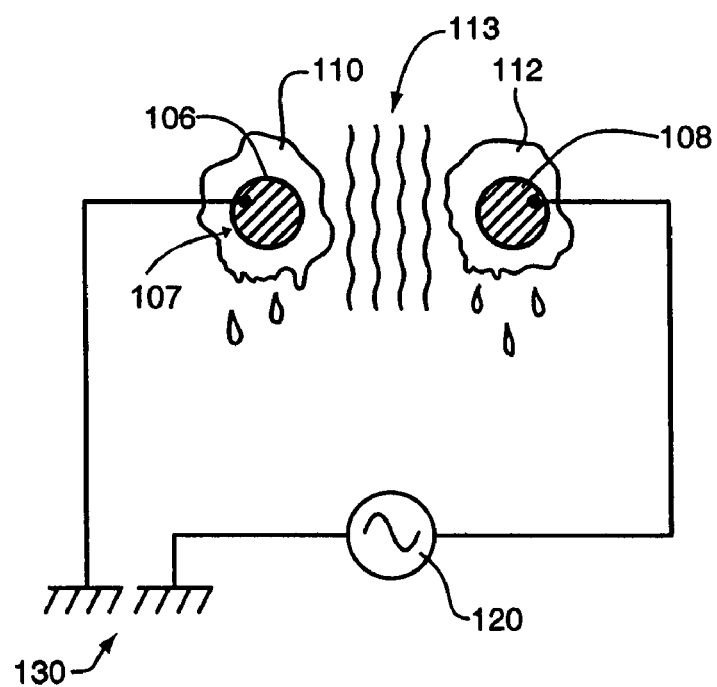
FIG. 2 depicts in schematic form the melting of ice on a cableway and electrical conductor in accordance with the invention, in which the electrical conductor is excited to a high potential relative to the cableway, which functions as ground.

FIG. 2 depicts in schematic form the operation of system 100 in accordance with the invention. Ski lift cableway 106 and electrical conductor 108 are covered by ice layers 110, 112, respectively, which have lossy dielectric properties. AC power source 120 is connected to electrical conductor 108 so that a high-frequency high-voltage AC current flows through electrical conductor 108, generating an AEF 113. Ski lift cableway 106, which has a surface 107, is proximate to electrical conductor 108, preferably within a distance of 0 to 30 cm. Conventional AC power source 120 is connected to electrical ground 130. Preferably, as depicted in FIG. 2, ski lift cableway 106 (or another object having a surface being protected against the ice) is connected to electrical ground 130. This is preferred so that ski lift cableway system 106 functions as electrical ground for AEF 113 and for the AC currents in ice layers 110, 112. As depicted in FIG. 2, ice layers 110, 112 carrier resistive (conductivity) component of AC current generated by the high-frequency voltage in electrical conductor 108, the resistive AC current generating Joule heat and melting the ice.

Figure 3:
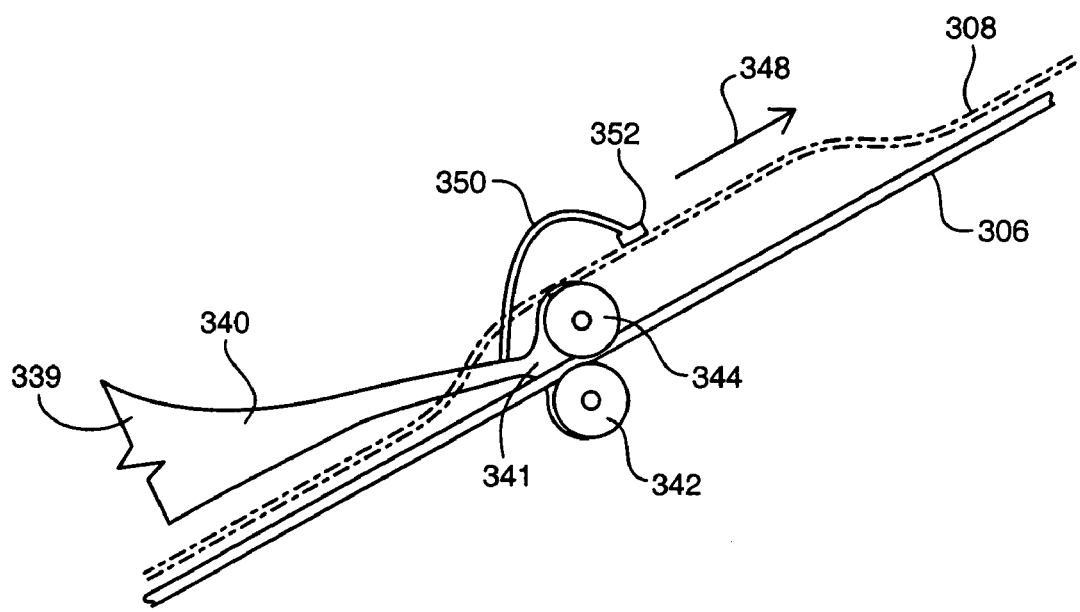
FIG. 3 depicts an embodiment in accordance with the invention in which the electrical conductor is stationary, being fixed at ski lift towers, and a ski lift cableway is movable.
Figure 4:
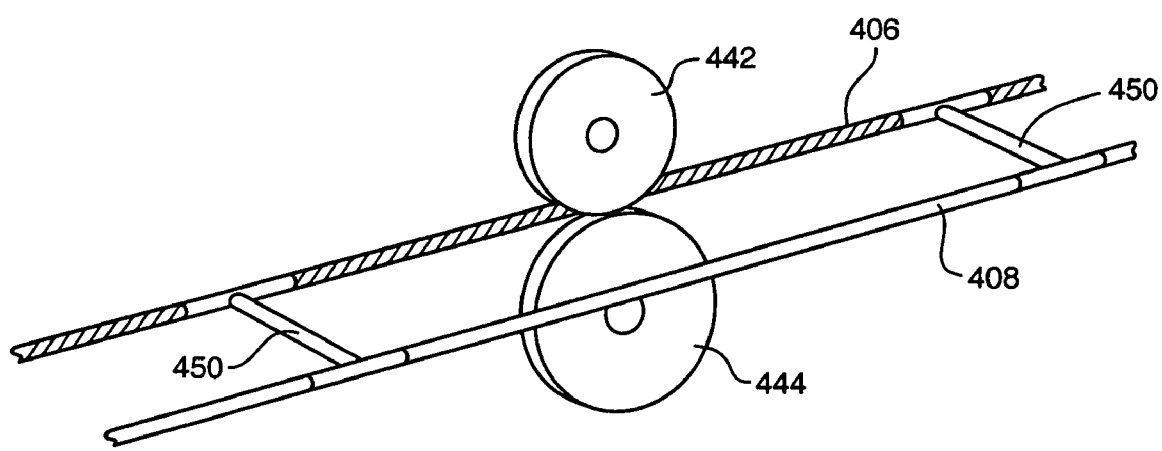
FIG. 4 depicts an embodiment in accordance with the invention in which the electrical conductor moves together with the cableway.

The electrical conductor for carrying high-frequency high-voltage AC current may be made hollow, and thus may be light. The electrical conductor cable can be fixed at a distance from an electrically conducting surface being protected in a number of ways. For example, as depicted in FIG. 3, electrical conductor 308 is stationary, being fixed at the ski lift towers, and ski lift cableway 306 moves to carry a ski lift (not shown). Ski lift carrying arm 340 at distal end 339 is coupled to a ski lift chair, gondola or other person-carrying cableway system component (not shown). At proximate end 341, ski lift carrying arm 340 is attached using conventional means to electrically insulating cable hangers 342, 344. Cable hangers 342, 344 typically are manufactured with dielectric ceramic, polymer or composite material. Cable hangers 342, 344 attach ski lift arm 340 to ski lift cable 306. Connected to ski lift carrying arm 340 is an electrically insulating guiding arm 350, having a conductor clasp 352. Guiding arm 350 clasps electrical conductor 308 and essentially pushes conductor 308 away from proximate end 341 and cable hangers 342, 344 as ski lift carrying arm 340 moves in the direction of arrow 348. The electrical conductor 308 is optionally coated with an insulating material to prevent electrical contact between electrical conductor 308 and non-insulated ski lift components. Another example is depicted in FIG. 4, in which electrical conductor 408 moves together with ski lift carrying cable 406. Ski lift carrying cable 406 and electrical conductor 408 are separated from each other at a fixed distance by electrically insulating spacers 450. Cable hangers 442, 444 connect the ski lift at a fixed position on ski lift cableway 406.

Figure 5:
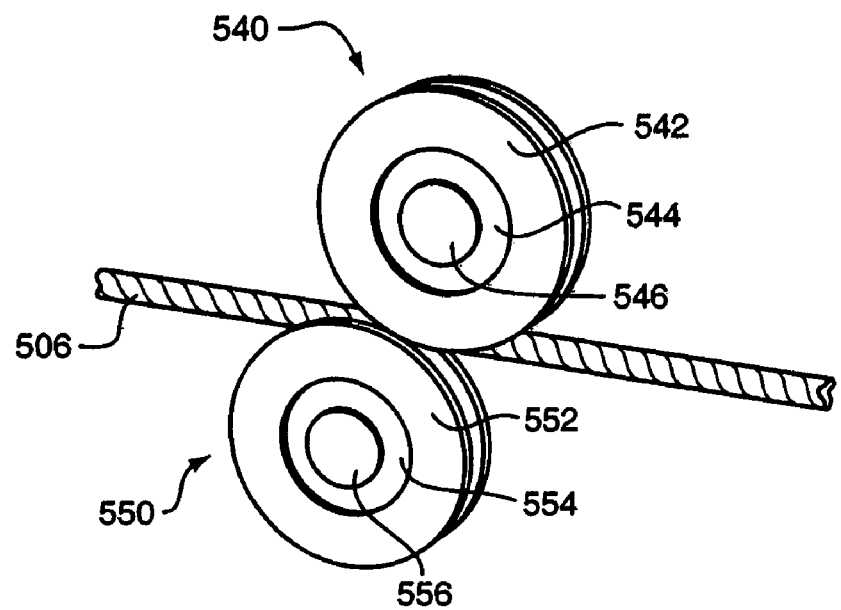
FIG. 5 depicts cable hangers attached to a ski lift cableway and containing an electrically insulating sandwich in accordance with the invention.

Various methods and structures and may be used to insulate electrically a carrying arm and the cableway from other, high-voltage elements of system, especially from an electrical conductor cable. For example, FIG. 5 depicts cable hangers 540, 550 attached to ski lift carrying cable 506 and having an electrically insulating layer 544, 554 sandwiched between electrically conducting metal layers 542, 546 and 552, 556, respectively. The electrically insulating sandwich layers 544, 554 may contain any of a number of structurally strong electrically insulating materials, such as a ceramic insulator material.

Figure 6:
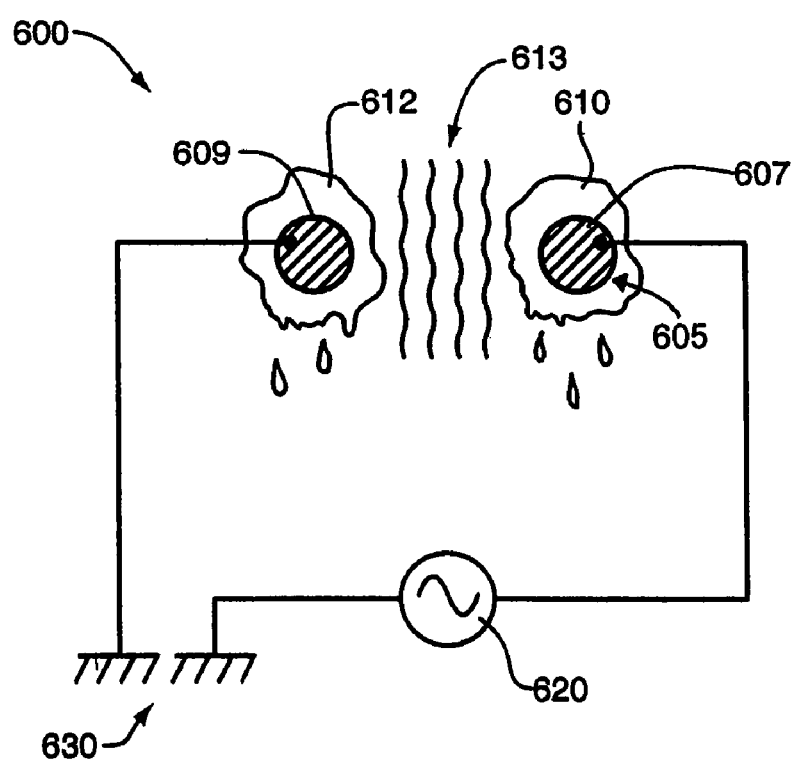
FIG. 6 depicts in schematic form the melting of ice on an electrical conductor/cableway and on a ground cable in accordance with the invention, in which the cableway is excited to a high potential relative to the ground cable.

In certain embodiments in accordance with the invention, a cableway includes an electrical conductor for generating an AEF in accordance with the invention. FIG. 6 depicts in schematic form the operation of a system 600 in accordance with the invention. Electrical conductor/cableway 607, which has a surface 605, and ground cable 609 are covered by ice layers 610, 612, respectively, which have lossy dielectric properties. High-frequency high-voltage AC power source 620 is connected to electrical conductor/cableway 607 so that the AC voltage generates AEF 613. Conventional AC power source 620 is connected to electrical ground 630. Ground cable 609 is connected to electrical ground 630. Ground cable 609 functions as electrical sink for AEF 613 and for the AC currents in ice layers 610, 612. Preferably, ground cable 609 is proximate to electrical conductor/cableway 607, that is, within a distance of 30 cm. Ice layers 610, 612 depicted in FIG. 6 carry resistive (conductivity) and capacitive AC current generated by the high-frequency voltage in electrical conductor/cableway 607. Through dielectric loss heating, the conductivity AC current generates Joule heat and melts the ice. Electrical conductor/cableway 607 is electrically insulated from other cableway system components and from ground cable 609.

Figure 7:
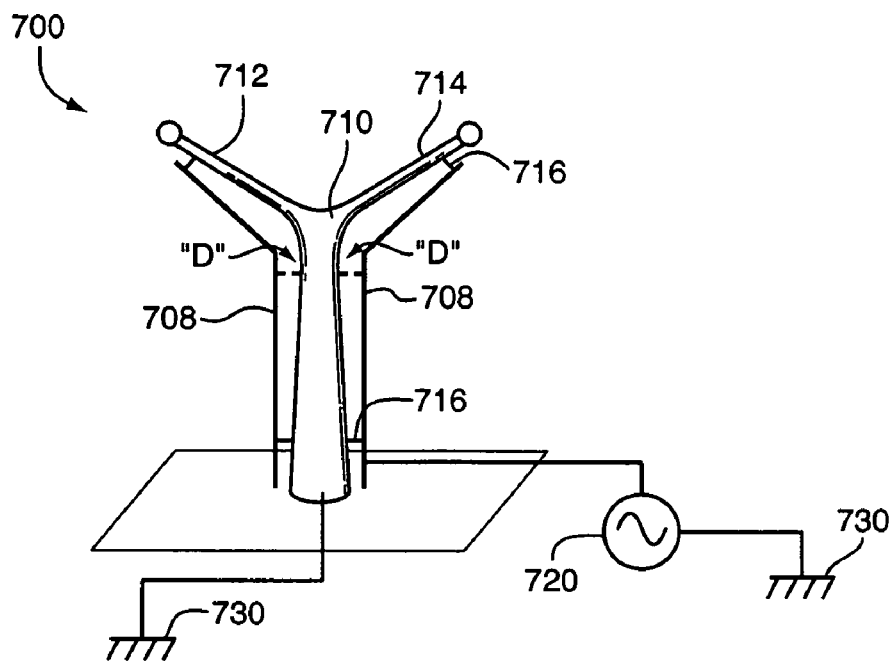
FIG. 7 depicts electrical conductors that are fixed proximate to a cableway system tower by electrically insulating spacers.

A system and a method in accordance with the invention are useful for de-icing other cableway system components, such as towers. In certain embodiments, one or more electrical conductors are disposed proximate to the component being protected against ice. For example, in system 700 depicted in FIG. 7, electrical conductors 708 are fixed within a proximate distance "D" of cableway system tower 710. Electrical conductors 708 are held in place and separated from cableway system tower 710, including cableway system supporting arms 712, 714, by electrically insulating spacers 716. Electrical conductors 708 are connected to AC power source 720. Generally, cableway system tower 710 or other cableway system component having a surface being protected against ice may be either electrically conductive or nonconductive. Typically, cableway system tower 710 is conductive and is connected to electrical ground 730 via ground cable 732, thereby functioning as an electrical sink for the AEF generated by a high-frequency voltage in electrical conductors 708. In another embodiment in accordance with the invention, a cableway system tower or other cableway system component is nonconductive and is located between electrical conductor 708 and ground cable 732 or other electrically conductive body functioning as an electrical sink. A power source 720 in accordance with the invention alternatively includes a transformer for transforming AC voltage having a low voltage to a higher voltage in accordance with the invention to increase the strength of the AEF.

Figure 8:
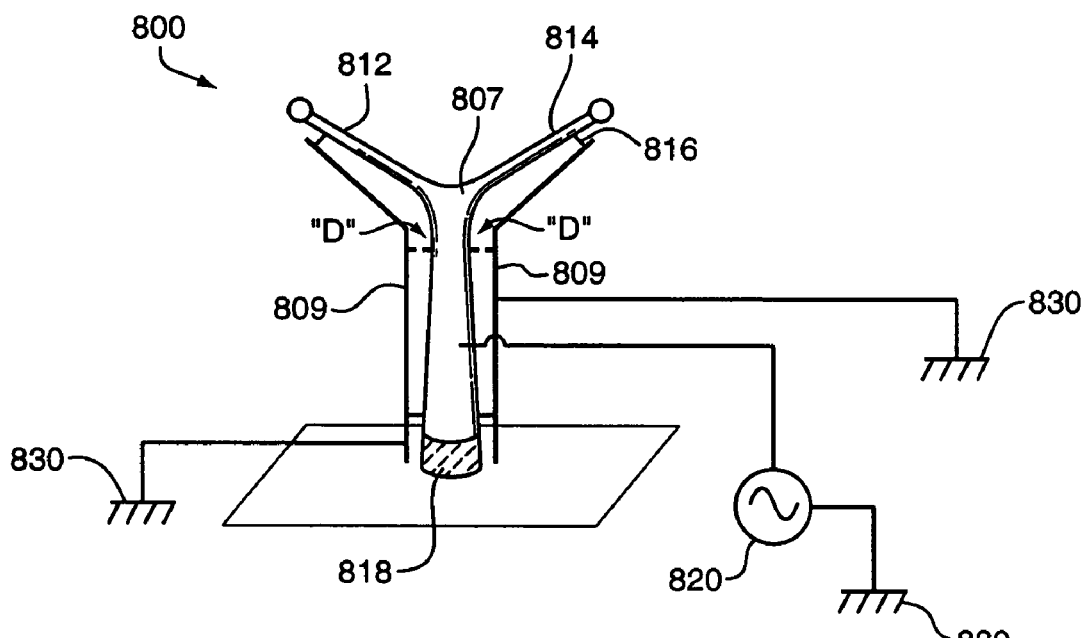
FIG. 8 depicts a system in accordance with the invention in which an electrical conductor is integral with a cableway system tower and ground cables are disposed proximate to the tower.

FIG. 8 depicts a system 800 in accordance with the invention in which an electrical conductor is integral with cableway system tower 807 so that the cableway system tower effectively functions as the electrical conductor. Preferably, one or a plurality of electrical sinks, such as ground cables 809, are connected to electrical ground 830 and disposed proximate to electrical conductor/cableway system tower 807 and to cableway system supporting arms 812, 814. Ground cables 809 are fixed within a proximate distance "D" of electrical conductor/cableway system tower 807 and supporting arms 812, 814 by electrically insulating spacers 816. Electrical conductor/cableway system tower 807 with supporting arms 812, 814 is insulated from an electrical ground by insulator 818 and is connected to AC power source 820 via power bus 822. In another embodiments in accordance with the invention, cableway system tower 807 or other cableway system component is nonconductive or the outside surface 836 of the cableway system tower 807 or other cableway system component is nonconductive. Tower bus 822 is connected to an electrical conductor integral with cableway system component 807. A high-frequency AC voltage applied to the electrical conductor generates an alternating electromagnetic field in ice on surface 836.

In a further embodiment in accordance with the invention, skin-effect (induction) heating is used to melt ice in systems in which the electrical conductor has a length of approximately one kilometer or more. Magnetic components of an alternating electromagnetic field tend to push electrical current lines towards the surface of a conductor. In a case of high-frequency AC current flowing in 2.5 cm diameter aluminum conductor cable at 60 kHz, for example, approximately 63 percent of the current flows in the outer 0.35 mm of the conductor; approximately 95 percent flows within 1.05 mm of the outer surface of the conductor. For an electrical conductor with a diameter of 2.5 cm, this condensation of current flow into a relatively smaller cross-sectional surface area of flow increases the overall resistance by a factor of approximately 20. With 221 amps of current, this results in a maximum heating power of approximately 50 W/m. As also described in PCT/US 00/05665, skin-effect heating may also be combined with the lossy dielectric effect to achieve de-icing. Skin-effect heating is useful in embodiments in accordance with the present invention when the spans of cableways are longer than the wavelength of the AC current. Unlike ice-dielectric heating, skin-effect heating occurs even when no ice is present. Thus, skin-effect heating prevents formation of ice on a conductor. When the high frequency AC conductor is proximate to the surface of the cableway system component being protected, the heat produced by the skin effect prevents formation of ice on the conductor, and also melts snow and ice as it deposits on the surface.

Figure 9:
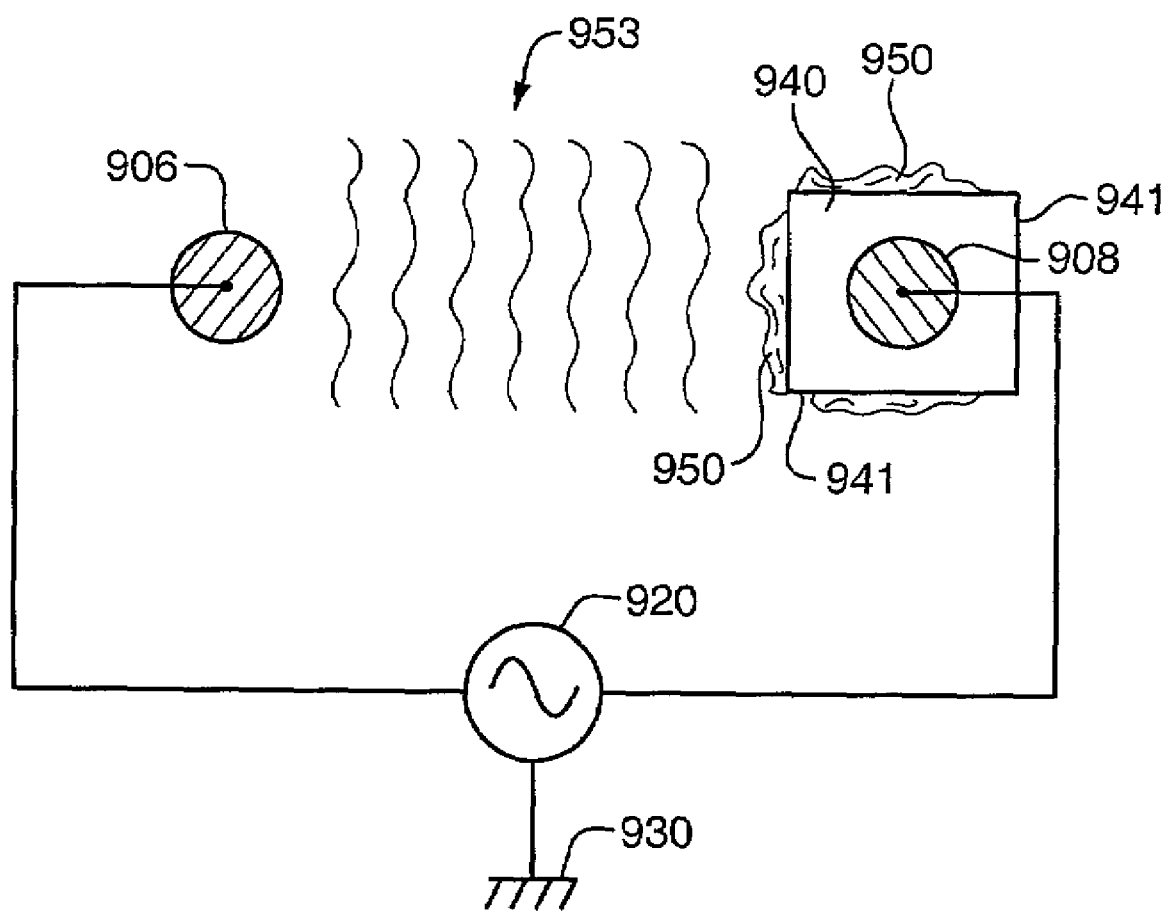
FIG. 9 depicts in schematic form a system in accordance with the invention in which a high-frequency AC voltage is applied to a first electrical conductor and a second electrical conductor at the same AC potential from ground, but 180 degrees out of phase.

In another embodiment in accordance with the invention, an AC voltage is applied to two electrical conductors 180 degrees out of phase with each other. Either one or both of the electrical conductors may include a surface being de-iced in accordance with the invention. Either one or both of the electrical conductors may be a cableway, or may be some other object being de-iced. FIG. 9 depicts in schematic form a system 900 in accordance with the invention. First electrical conductor 908 and second electrical conductor 906 are each connected to a power terminal of AC power source 920. A ground terminal of power source 920 is connected to electrical ground 930. High-frequency AC voltage is applied to first electrical conductor 908 and second electrical conductor 906 at the same AC potential from ground, but 180 degrees out of phase with each other, corresponding to conventional sinusoidal AC voltage or to some other waveform. Preferably, first electrical conductor 908 is proximate to second electrical conductor 906, that is, within a distance of 30 cm. One or both of electrical conductors 906, 908 may be integral with an object, such as a cableway, a cableway system component, a bridge, a ship superstructure or other conductive or nonconductive object. As depicted in schematic diagram of FIG. 9, first electrical conductor 908 is integral with an object 940 having a surface 941. Ice 950 covers a portion of surface 941. The high-frequency voltage in first electrical conductor 908 and second electrical conductor 906 generate AEF 953. Capacitive current associated with the AEF 953 flows through ice 950. Through dielectric loss heating, the portion of the AC current that flows through the ice resistively (by conduction) generates Joule heat, melting the ice.

Systems and methods in accordance with the invention typically provide heating and de-icing of cableways and and other components while the cableway system is not in operation, for example, during the night. Embodiments of the invention are also useful while the cables and cableway system chairs are moving during normal operation. The various embodiments in accordance with the invention provide relatively simple, reliable and inexpensive systems and methods for preventing and removing ice on the surface of an object. Although the embodiments have been described principally with regard to de-icing of cableway systems, in particular, ski lifts, the structures and methods herein described are applicable to many other types of objects. For example, methods and systems in accordance with the invention are useful for de-icing surfaces of bridges, ships, and steel towers. It is evident that those skilled in the art may now make numerous uses and modifications of the specific embodiments described, without departing from the inventive concepts. It is also evident that the steps recited may, in some instances, be performed in a different order; or equivalent structures and processes may be substituted for the structures and processes described. Since certain changes may be made in the above apparatus and methods without departing from the scope of the invention, it is intended that all subject matter contained in the above description or shown in the accompanying drawing be interpreted as illustrative and not in a limiting sense. Consequently, the invention is to be construed as embracing each and every novel feature and novel combination of features present in and/or possessed by the systems, methods and compositions described.

The invention claimed is:

1. A system for de-icing a surface of a cableway system component comprising:
an electrical conductor proximate to, but not in contact with, the surfaces,
wherein the electrical conductor is not configured to encircle the cableway system component; and
an AC power source for providing a high-frequency AC voltage in the electrical conductor that generates a high-frequency alternating electric field at the surface sufficient to melt ice at the surface.

2. A system as in claim 1, wherein the cableway system component functions as an electrical sink for the alternating electric field.

3. A system as in claim 2, wherein the cableway system component is connected to electrical ground.

4. A system as in claim 1, wherein the electrical conductor is disposed at a distance of about from 0 to 30 cm from the cableway system component.

5. A system as in claim 1, further comprising an electrical sink, the electrical sink located proximate to the electrical conductor to increase the strength of the alternating electric field at the surface.

6. A system as in claim 5, wherein the surface is disposed between the electrical conductor and the electrical sink.

7. A system as in claim 5, wherein the electrical conductor is disposed at a distance of about from 0 to 30 cm from the electrical sink.

8. A system as in claim 1, wherein the cableway system component is electrically conductive and is connected to the AC power source, the electrical conductor is connected to the AC power source, so that the AC power source energizes the cableway system component and the electrical conductor at the same AC potential but 180 degrees out of phase from each other.

9. A system as in claim 1, wherein the AC power source provides high-frequency AC voltage with a frequency in a range of about from 60 kHz to 100 kHz.

10. A system as in claim 1, wherein the AC power source provides high-frequency AC voltage with a voltage in a range of about from 3 kV to 15 kV.

11. A system as in claim 1, further comprising an electrically insulating spacer that separates the electrical conductor and the cableway system component.

12. A system as in claim 1, wherein the cableway system component is a cableway.

13. A system as in claim 1, wherein the cableway system component is a cableway system tower.

14. A system as in claim 1, wherein the electrical conductor is integral with the cableway system component.

15. A system for melting ice on a cableway system component, comprising:
a first electrical conductor disposed at a distance of about from 0 to 30 cm from the ice wherein a physical space separates the first electrical conductor from the cableway system component and wherein the electrical conductor is not configured to encircle the cableway system component; and
an AC power source for providing a high-frequency AC voltage in the first electrical conductor so that the AC voltage generates a high-frequency alternating electric field in the ice.

16. A system as in claim 15, further comprising an electrical sink, the electrical sink disposed at a distance of about from 0 to 30 cm from the first electrical conductor to increase the strength of the alternating electric field.

17. A system as in claim 16, wherein the electrical sink is connected to electrical ground.

18. A system as in claim 17, wherein the ice is disposed between the first electrical conductor and the electrical sink.

19. A system as in claim 15, wherein the ice covers a surface of an object being de-iced, and the electrical sink is integral with the object.

20. A system as in claim 15, wherein the ice covers a surface of art object being de-iced, and the first electrical conductor is integral with the object.

21. A system as in claim 15, further comprising a second electrical conductor connected to the AC power source, wherein the first electrical conductor is connected to the AC power source, so that the AC power source energizes the first electrical conductor and the second electrical conductor at the same AC potential but 180 degrees out of phase from each other.

22. A system as in claim 15, wherein the AC power source provides high-frequency AC voltage with a frequency in a range of about from 60 kHz to 100 kHz.

23. A system as in claim 15, wherein the AC power source provides high-frequency AC voltage with a voltage in a range of about from 3 kV to 15 kV.

24. A method for de-icing a surface of a cableway system component, comprising a step of:
applying a high-frequency AC voltage to an electrical conductor that is located proximate to the surface, to generate a high-frequency alternating electric field that melts ice at the surface, wherein a physical space separates the electrical conductor from the surface and wherein the electrical conductor is not configured to encircle the cableway system component.

25. A method as in claim 24, wherein the step of applying high-frequency AC voltage includes flowing AC current with a frequency in a range of about from 60 kHz to 100kHz.

26. A method as in claim 24, wherein the step of applying high-frequency AC voltage includes applying AC voltage with a voltage in a range of about from 3 kV to 15 kV.

27. A method as in claim 24, further including separating the electrical conductor from the cableway system component using an electrically insulating spacer.

28. A method as in claim 24, further comprising a step of connecting the cableway system component to electrical ground.

29. A method as in claim 24, further comprising a step of providing an electrical sink, wherein the surface is located between the electrical conductor and the electrical sink.

30. A method as in claim 24, wherein the cableway system component is electrically conductive and further comprising the steps of:
connecting an AC power source to the cableway system component;
connecting the AC power source to the electrical conductor; and
connecting the AC power source to the electrical ground, so that the AC power source energizes the cableway system component and the electrical conductor at the same AC potential but 180 degrees out of phase from each other.

31. A method for melting ice on a cableway system component, comprising a step of:
applying a high-frequency AC voltage to a first electrical conductor that is located at a distance of about from 0 to 30 cm from the ice, wherein a physical space separates the first electrical conductor from the cableway system component and wherein the electrical conductor is not configured to encircle the cableway system component, to generate a high-frequency alternating electric field that melts the ice.

32. A method as in claim 31, wherein the step of applying high-frequency AC voltage includes flowing AC current with a frequency in a range of about from 60 kHz to 100 kHz.

33. A method as in claim 31, wherein the step of applying high-frequency AC voltage includes applying AC voltage with a voltage in a range of about from 3 kV to 15 kV.

34. A method as in claim 31, further comprising a step of providing an electrical sink within a distance of about from 0 to 30 cm from the first electrical conductor.

35. A method as in claim 34, wherein the ice is located between the electrical conductor and the electrical sink.

36. A method as in claim 34, wherein the ice covers a surface of an object being de-iced, and the electrical sink is integral with the object.

37. A method as in claim 34, further comprising a step of connecting the electrical sink to electrical ground.

38. A method as in claim 31, further comprising steps of:
applying the AC voltage to a second electrical conductor 180 degrees out of phase from the first electrical conductor so that an AC power source energizes both the first and second electrical conductors.

* * * * *

UNITED STATES PATENT AND TRADEMARK OFFICE
CERTIFICATE OF CORRECTION

PATENT NO.       : 7,164,100 B2                                          Page 1 of 1
APPLICATION NO.  : 10/057859
DATED            : January 16, 2007
INVENTOR(S)      : Victor F. Petrenko et al.

It is certified that error appears in the above-identified patent and that said Letters Patent is hereby corrected as shown below:

Column 9, line 65, claim 1, the words "the surfaces" should read --the surface--;

Signed and Sealed this

Sixteenth Day of October, 2007

JON W. DUDAS
*Director of the United States Patent and Trademark Office*